(12) United States Patent
Murakami

(10) Patent No.: US 7,607,145 B2
(45) Date of Patent: Oct. 20, 2009

(54) STRUCTURE FOR FIXING SPINDLE MOTOR TO TRAVERSE CHASSIS

(75) Inventor: Takayuki Murakami, Daito (JP)

(73) Assignee: Funai Electric Co., Ltd. (JP)

( * ) Notice: Subject to any disclaimer, the term of this patent is extended or adjusted under 35 U.S.C. 154(b) by 558 days.

(21) Appl. No.: 11/503,233

(22) Filed: Aug. 14, 2006

(65) Prior Publication Data

US 2007/0044115 A1   Feb. 22, 2007

(30) Foreign Application Priority Data

Aug. 22, 2005   (JP) .............................. 2005-239592

(51) Int. Cl.
*G11B 7/08* (2006.01)
*G11B 25/04* (2006.01)
(52) U.S. Cl. ...................... 720/697; 720/700
(58) Field of Classification Search ............. 369/263.1, 369/264, 269; 720/697, 700
See application file for complete search history.

(56) References Cited

U.S. PATENT DOCUMENTS 6,181,669 B1 *   1/2001   Park ........................... 720/697
6,772,428 B2 *   8/2004   Kim et al. ................... 720/697
2003/0112734 A1 *  6/2003   Shishido et al. ............. 369/263

FOREIGN PATENT DOCUMENTS

| JP | 02116076 A | * | 4/1990 |
| JP | 2003-085780 | | 3/2003 |
| JP | 2003257047 A | * | 9/2003 |
| JP | 2004-087031 | | 3/2004 |
| JP | 2005-063549 | | 3/2005 |

* cited by examiner

*Primary Examiner*—William J Klimowicz
(74) *Attorney, Agent, or Firm*—Bacon & Thomas, PLLC (57) ABSTRACT

A fixing structure fixes the position of a spindle motor against a traverse chassis in the direction of the movement of an optical pickup (first direction), and can be adjusted in the direction perpendicular thereto (second direction). In the bottom surface of the spindle motor: an elongated reference hole, the longest dimension of which extends in the radial direction, centered on a main shaft; and three screw holes circumferentially spaced, centered on the main shaft. A traverse chassis includes a protrusion engaged within the reference hole; and elongated through holes elongated in the second direction at positions corresponding to those of the screw holes. The cross-sectional width A of the protrusion in the first direction is approximately the same as the width of the reference hole, while the cross-sectional width B in the second direction is smaller than the cross-sectional width A in the first direction.

5 Claims, 8 Drawing Sheets

(Prior Art)

F I G. 7

(Prior Art)

STRUCTURE FOR FIXING SPINDLE MOTOR TO TRAVERSE CHASSIS

BACKGROUND OF THE INVENTION

1. Field of the Invention

The present invention relates to an optical disk apparatus for reproducing/recording information from/onto an optical disk such as CD or DVD, an information recording medium, and particularly to a structure for fixing a spindle motor for rotating such an optical disk onto a traverse chassis.

2. Description of the Prior Art

Optical disk apparatuses are generally adapted to rotate a clamped optical disk and to apply a laser beam to the recording surface of the optical disk to write information onto the recording surface (recording), and further to receive a laser beam reflected at the recording surface of the optical disk to read information from the recording surface (reproduction). Reproduction and recording are performed through an optical pickup adapted to move back and forth in the radial direction along the recording surface of the optical disk. The movement of the optical pickup is generally guided by a pair of guide shafts supported on a traverse chassis in parallel with the direction of the movement.

Also, the optical disk is clamped between a turntable and a damper that faces the turntable. The optical disk is rotated by fixing the turntable to the leading end portion of a main shaft and driving a spindle motor fixed on the traverse chassis.

The traverse chassis here is adapted to rotate with respect to a main chassis with the optical disk housed therein to move up and down (vertically) in such a manner as to come close to and get away from the recording surface of the optical disk, and the optical disk is to be clamped when the traverse chassis is in the top position.

Meanwhile, such optical disk apparatuses are arranged in such a manner that when fixing the spindle motor onto the traverse chassis, the fixing position can be adjusted in the direction (tangential direction of the optical disk (referred to as second direction)) perpendicular to the direction of the movement of the optical pickup (radial direction of the optical disk (referred to as first direction)). A related art concerning a structure for fixing a spindle motor to a traverse chassis for achieving such an arrangement will be described with reference to FIGS. 3 to 9.

Figure 3:
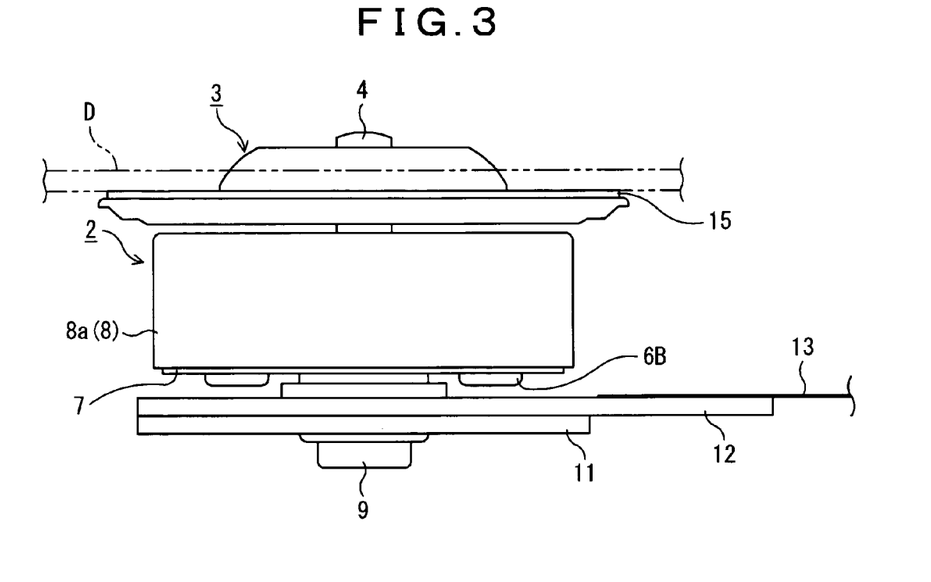
FIG. 3 is a side view of a general spindle motor that is also common to the present invention.
Figure 4:
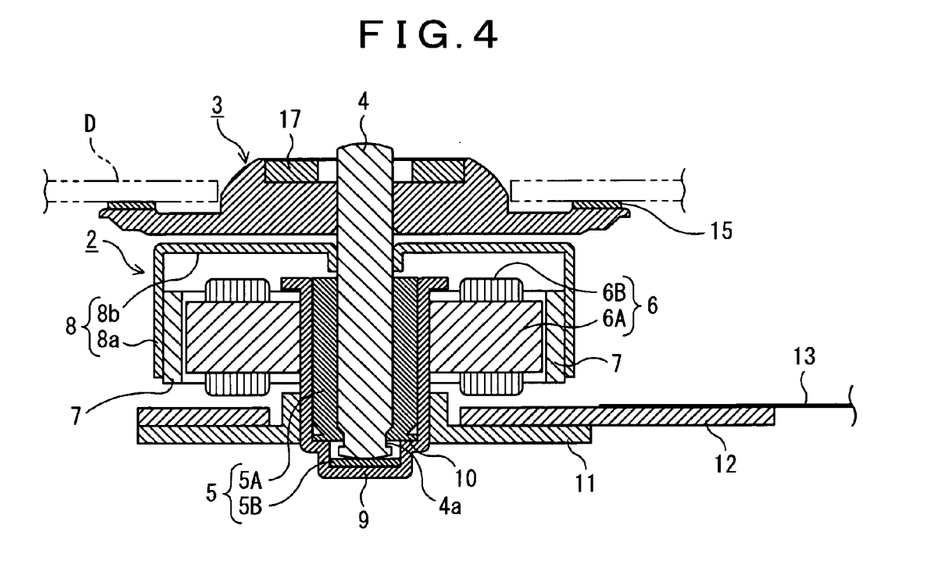
FIG. 4 is a vertical cross-sectional view of the spindle motor shown in FIG. 3.

First will be described an essential structure of the spindle motor. As shown in FIGS. 3 and 4, the spindle motor 2 is composed mainly of: a main shaft 4; a bearing 5 for supporting the main shaft 4 rotatably; static electromagnets 6 disposed around the bearing 5; and a rotor housing 8 provided with permanent magnets 7 in such a manner as to surround the electromagnets 6 and fixed to the main shaft 4. The bearing 5 includes: a sleeve-shaped radial bearing 5A for receiving the main shaft 4 and for supporting the peripheral surface of the main shaft 4; and a disk-shaped thrust bearing 5B for supporting the rounded lower end surface of the main shaft 4, the radial bearing 5A and thrust bearing 5B being fitted and held in a cylindrical bearing holder 9 with the lower end thereof being closed.

The main shaft 4 is supported rotatably by the radial bearing 5A with the upper end portion thereof protruding from the bearing holder 9 and the downward movement thereof being limited by the thrust bearing 5B. Also, in the peripheral surface in the lower end portion of the main shaft 4, there is formed a groove 4a in the circumferential direction, and a washer 10 attached to the groove 4a and fitted in the bearing holder 9 prevents the main shaft 4 from moving off upward. The bearing holder 9 is fixed to a metal base plate 11 that forms the bottom surface of the spindle motor 2 by caulking, etc. and protrudes significantly upward from the base plate 11. Then, a circuit board 12 for controlling the driving of the spindle motor 2 is attached onto the base plate 11, and a cable 13 connected to the circuit extends from the circuit board 12.

A plurality of cores 6A extending equiangularly in the radial direction centering on the supported main shaft 4 are attached around the bearing holder 9 that protrudes upward from the base plate 11, and each core 6A is wound with a coil 6B. The coils 6B are connected to the circuit on the circuit board 12. The cores 6A and coils 6B function as the electromagnets 6.

The rotor housing 8 is formed of a metal plate and has a cylindrical portion 8a for surrounding the electromagnets 6 and a flange-like portion 8b fixed to the main shaft 4 by caulking, etc. while covering the upper end of the cylindrical portion 8a. Thus, the upper end portion of the main shaft 4 protrudes significantly from the flange-like portion 8b. Also, the plurality of permanent magnets 7 are attached to the inner peripheral surface of the cylindrical portion 8a, while ensuring clearances with respect to the electromagnets 6, in such a manner that the polarity thereof toward the electromagnets 6 alternates in the circumferential direction.

In the thus arranged spindle motor 2, when a current that has alternating positive and negative values (i.e. alternating current) flows through the coils 6B, a magnetic field that has alternating directions occurs in each core 6A, whereby the magnetic effect with each permanent magnet 7 gives a rotational force to the rotor housing 8 so that the main shaft 4 is driven and rotated integrally with the rotor housing 8.

Further, a disk-shaped turntable 3 made of synthetic resin is fitted and fixed to the upper end portion of the main shaft 4. Thus, the turntable 3 is to be rotated integrally with the main shaft 4 and the rotor housing 8 with the flange-like portion 8b of the rotor housing 8 being arranged therebelow.

The center of the turntable 3 protrudes significantly upward, and the inner periphery of an optical disk D (refer to the alternate long and two short dashes line in the figures) is to be guided to the protruding center of the turntable 3. Also, an annular rubber plate 15 having a moderate elasticity as well as a high friction coefficient is applied to the peripheral edge portion on the turntable 3 using a two-sided adhesive tape or adhesive agent, and the optical disk D is supported on the annular rubber plate 15 in a contact manner. Further, a magnetic piece 17 is embedded in the center of the turntable 3. The magnetic piece 17 has a function of pulling a damper not shown in the figures downward through an attractive effect with a magnet provided integrally in the clamper, and thus of clamping the optical disk D firmly between the lower surface of the damper and the annular rubber plate 15 on the turntable 3.

Figure 5:
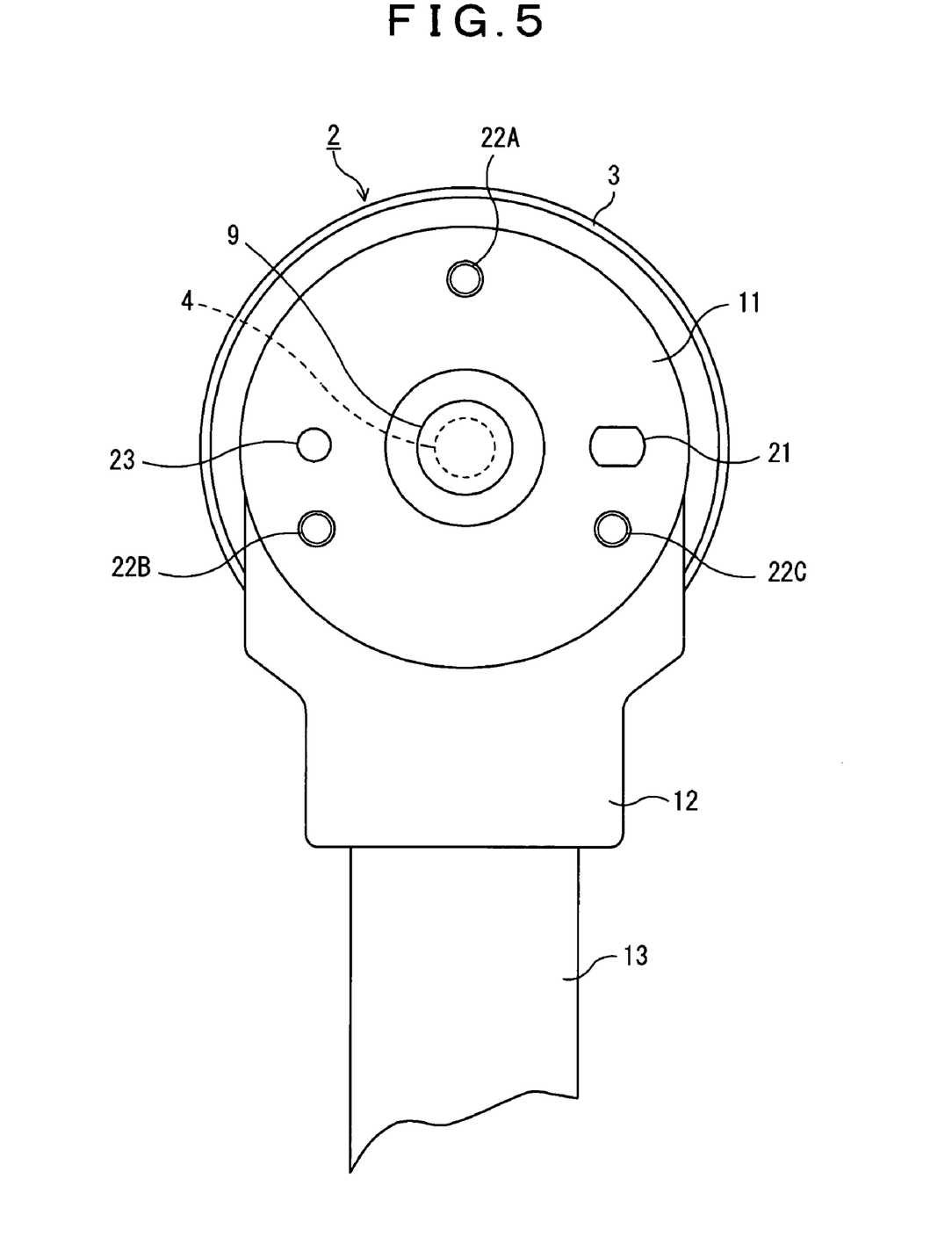
FIG. 5 is a bottom view of the general spindle motor that is also common to the present invention.

Next will be described a structure for fixing the thus arranged spindle motor 2 to the traverse chassis. As shown in FIG. 5, in the base plate 11 that forms the bottom surface of the spindle motor 2, there is formed an elongated reference hole 21, the longitudinal direction of which extends in the radial direction centering on the bearing holder 9, that is, the main shaft 4. The reference hole 21 here is arranged in the direction perpendicular to that in which the cable 13 extends centering on the main shaft 4. The reference hole 21 is adapted to be engaged with a protrusion 31 on the traverse chassis 1, which will hereinafter be described in detail, and to be used as a positioning reference when fixing the spindle motor 2 to the traverse chassis 1.

In the base plate 11, there are also formed three screw holes 22A, 22B, and 22C provided equiangularly centering on the main shaft 4. Here, the screw hole 22A among the three screw holes 22A, 22B, and 22C is arranged at a position perpendicular to the reference hole 21 centering on the main shaft 4 and opposite to the direction in which the cable 13 extends. Therefore, the rest two screw holes 22B and 22C are arranged in parallel with the direction in which the reference hole 21 is elongated. The respective screw holes 22A, 22B, and 22C are adapted to receive screws 42A, 42B, and 42C penetrating through holes 32A, 32B, and 32C in the traverse chassis 1, which will hereinafter be described in detail, and to be used to fix the spindle motor 2 to the traverse chassis 1.

In the base plate 11, there is further formed a small hole 23 at a position opposite to the reference hole 21 with respect to the main shaft 4. The small hole 23 is adapted to receive a pin 51 of an adjusting tool 50, which will hereinafter be described in detail, and to be used to adjust the fixing position of the spindle motor 2 against the traverse chassis 1.

Figure 6:
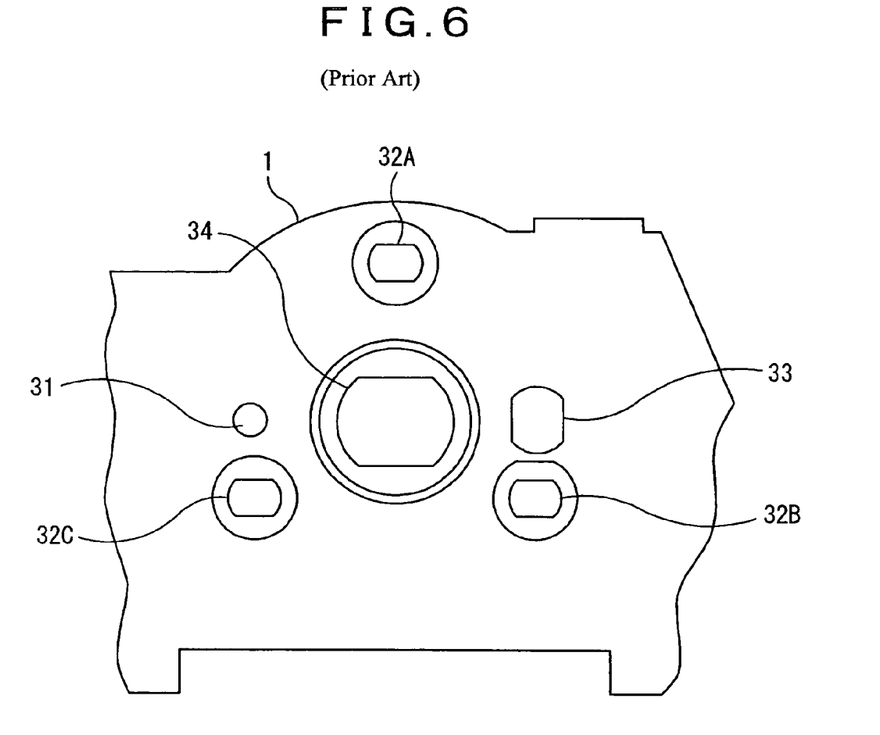
FIG. 6 is a top view of a conventional traverse chassis.

Meanwhile, in the traverse chassis 1, there is formed an elongated center hole 34 for receiving the lower end portion of the bearing holder 9 that protrudes from the base plate 11 of the spindle motor 2, as shown in FIG. 6. The center hole 34 is elongated in the direction perpendicular to the direction of the movement of the optical pickup, that is, in the second direction and has a width approximately the same as but, when more appropriate, slightly greater than the cross-sectional width (diameter) of the lower end portion of the bearing holder 9.

On the traverse chassis 1, there is also formed a protrusion 31 adapted to be engaged with the reference hole 21 that is formed in the base plate 11 of the spindle motor 2 when the reference hole 21 is arranged in an elongated manner in the second direction. The protrusion 31 here has a circular cross-sectional shape with a cross-sectional width (diameter) approximately the same as but, when more appropriate, slightly smaller than the width of the reference hole 21.

In the traverse chassis 1, there are further formed elongated through holes 32A, 32B, and 32C at the positions corresponding to those of the respective screw holes 22A, 22B, and 22C that are formed in the base plate 11 of the spindle motor 2. The through holes 32A, 32B, and 32C are elongated in the second direction and have a width approximately the same as but, when more appropriate, slightly greater than the diameter of the screw holes 22A, 22B, and 22C, that is, the diameter of the screws 42A, 42B, and 42C to be described hereinafter.

In the traverse chassis 1, there is still further formed an elongated through hole 33 at the position corresponding to that of the small hole 23 that is formed in the base plate 11 of the spindle motor 2. The through hole 33 is elongated in the direction of the movement of the optical pickup, that is, in the first direction, and is adapted to receive the shaft part 52 of the adjusting tool 50 to be described hereinafter to be rotatable.

Figure 7:
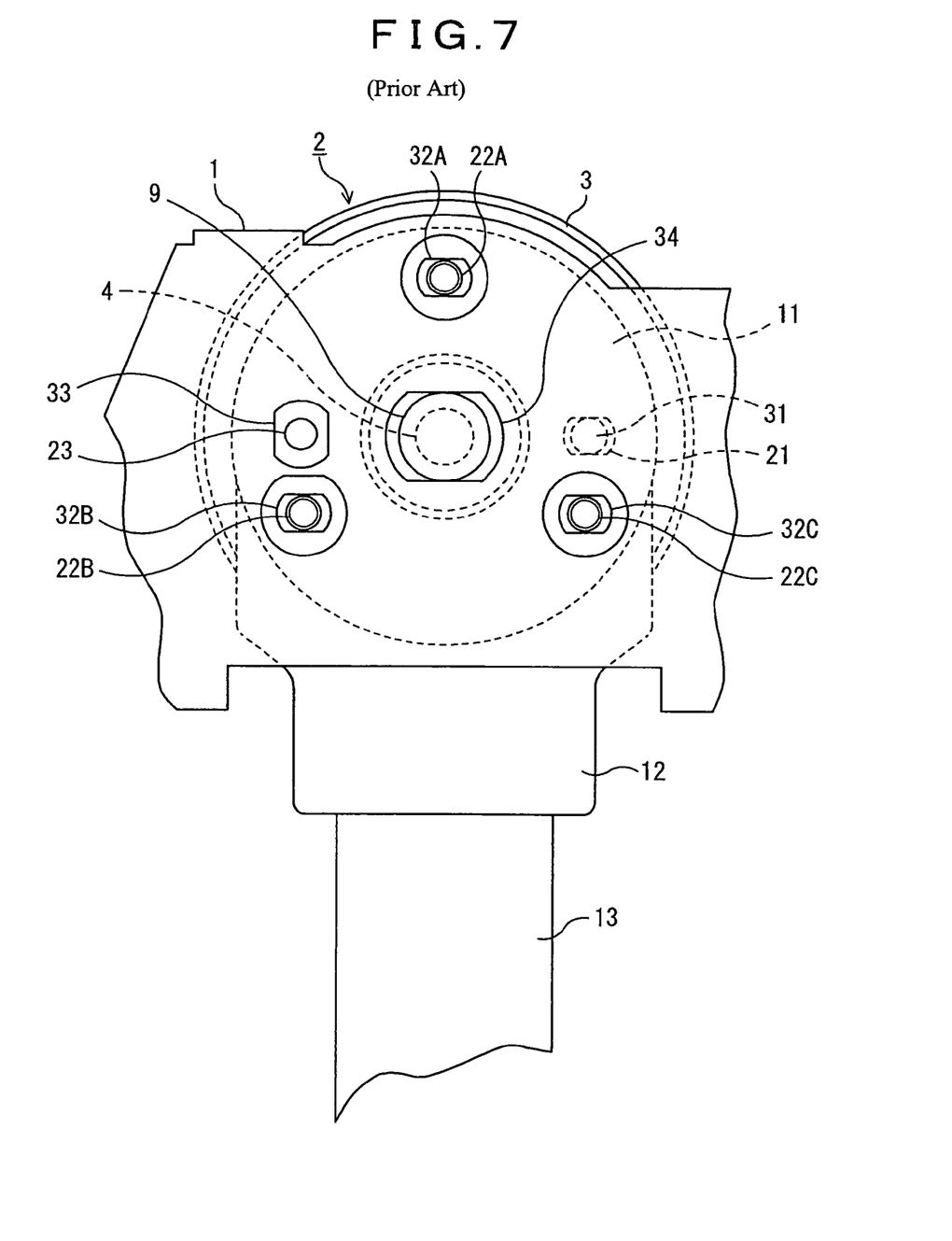
FIG. 7 is a bottom view showing a state where the spindle motor is laid on the traverse chassis shown in FIG. 6.

As shown in FIGS. 7, 8 (a), and 8 (b), when fixing the spindle motor 2 to the traverse chassis 1 under the arrangement above, the spindle motor 2 is laid on the traverse chassis 1, and the lower end portion of the bearing holder 9 that protrudes from the base plate 11 is engaged with the center hole 34 as well as the protrusion 31 on the traverse chassis 1 is engaged with the reference hole 21 in the base plate 11. Next, as shown in FIG. 8 (c), the screws 42A, 42B, and 42C are inserted and screwed lightly into the respective screw holes 22A, 22B, and 22C in the base plate 11 through the respective through holes 32A, 32B, and 32C in the traverse chassis 1.

Figure 8A:
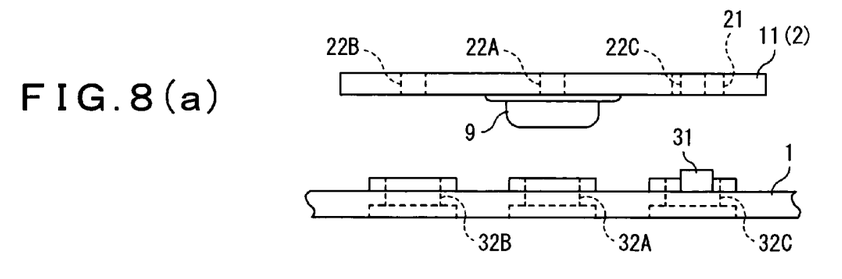
FIGS. 8(a)-8(d) are side views showing a procedure of fixing the spindle motor to the traverse chassis shown in FIG. 6.
Figure 8B:
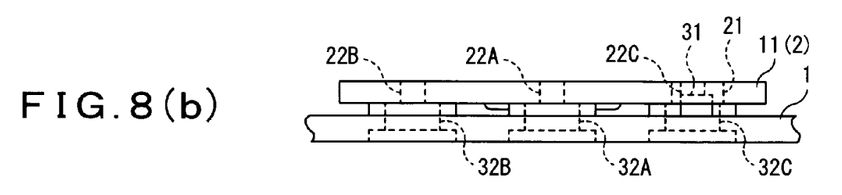
Figure 8C:
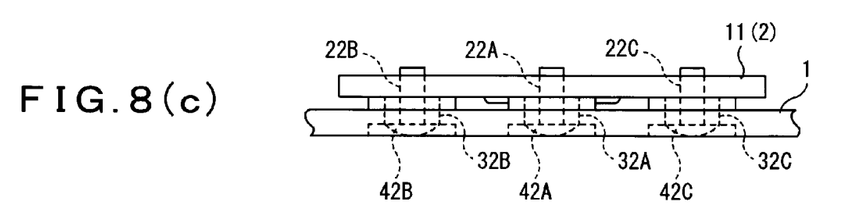

In the state above, the movement of the protrusion 31 is limited in the first direction by the engaging reference hole 21, while allowed in the second direction by the length of the longitudinal clearance in the reference hole 21. Also, the movement of the lower end portion of the bearing holder 9 is limited in the first direction while allowed in the second direction by the engaging center hole 34, and the movement of the screws 42A, 42B, and 42C that are screwed into the respective screw holes 22A, 22B, and 22C is limited in the first direction while allowed in the second direction by the respective through holes 32A, 32B, and 32C. Therefore, the position of the spindle motor 2 against the traverse chassis 1 is fixed in the first direction, while the fixing position can be adjusted in the second direction by the length of the longitudinal clearance between the protrusion 31 and the reference hole 21.

A standard optical disk is mounted in such a state, and a special-purpose testing machine is used to detect whether or not the spindle motor 2 is in a proper position in the second direction with respect to the traverse chassis 1. If the position is out of the proper position, the spindle motor 2 is displaced in the second direction to be adjusted against the traverse chassis 1.

Figure 8D:
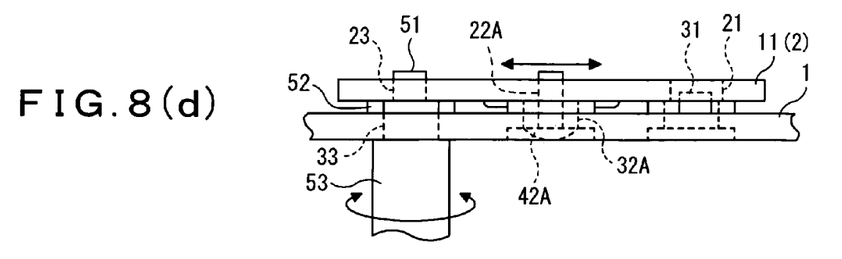
Figure 9:
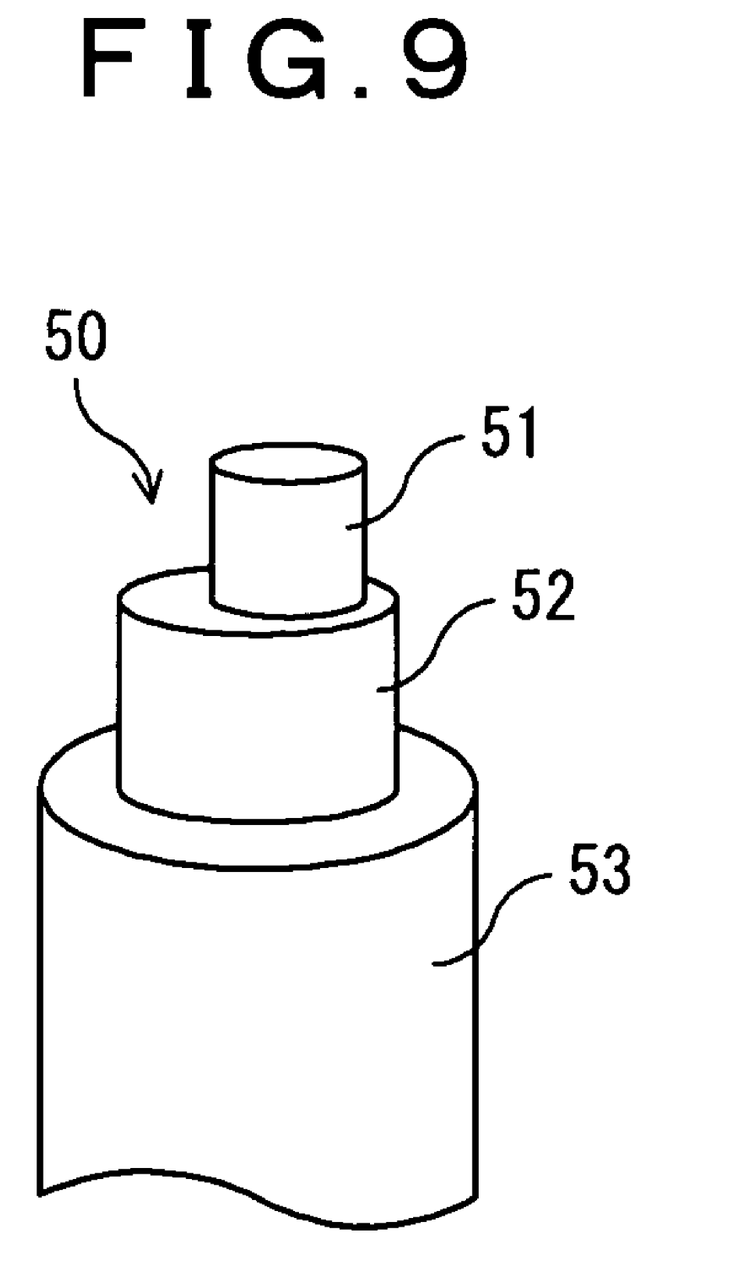
FIG. 9 is a perspective view of a general adjusting tool that is also common to the present invention.

The adjustment is performed using the adjusting tool 50. Specifically, as shown in FIG. 9, the adjusting tool 50 has: the shaft part 52 having a diameter approximately the same as the width of the through hole 33 that is formed in the traverse chassis 1; the pin 51 having a diameter approximately the same as that of the small hole 23 that is formed in the base plate 11 and protruding eccentrically from the apical surface of the shaft part 52; and a handle part 53 connected to the rear end of the shaft part 52. As shown in FIG. 8 (d), the shaft part 52 is inserted into the through hole 33 in the traverse chassis 1 and the pin 51 is inserted into the small hole 23 in the base plate 11 by holding the handle part 53 of the thus configured adjusting tool 50, and then the shaft part 52 is rotated within the through hole 33 by rotating the handle part 53. This causes the pin 51 to be deflected within the range of the through hole 33, and accordingly the small hole 23 in the base plate 11 is displaced forcibly in the second direction. Thus, the spindle motor 2 is displaced in the second direction to be adjusted against the traverse chassis 1.

Then, after the spindle motor 2 is adjusted to be in the proper position in the second direction, the screws 42A, 42B, and 42C are again screwed firmly into the respective screw holes 22A, 22B, and 22C in the base plate 11. This allows the base plate 11 to be fixed firmly to the traverse chassis 1. The fixing of the spindle motor 2 to the traverse chassis 1 will thus be completed.

It is noted that in addition to such a fixing structure as mentioned above, there have also been proposed structures in which the height of fixing the spindle motor 2 to the traverse chassis 1 and/or the height of the guide shafts for guiding the optical pickup can be adjusted so that the incident angle of a laser beam from the optical pickup to an optical disk, that is, skew can be adjusted (refer to Japanese Patent Laid-Open Publication Nos. 2005-63549, 2004-87031, and 2003-85780 for example).

However, in the above-described structure for fixing the spindle motor 2 to the traverse chassis 1, since the fixing position of the spindle motor 2 has only a small adjustable margin in the second direction, the fixing position may not be adjusted sufficiently. The adjustable margin is limited to the length of the longitudinal clearance between the protrusion 31 on the traverse chassis 1 and the reference hole 21 in the base plate 11 for the reason, especially when employing a general-purpose spindle motor 2 with the main aim of reducing cost, that the size of the reference hole 21 is standardized and predefined. Changing the size of the reference hole 21 in the longitudinal direction to increase the adjustable margin will naturally result in an increase in procurement cost for the spindle motor 2.

SUMMARY OF THE INVENTION

Hence, the present invention has been made in consideration of the above-described problems, and an object thereof is to provide an inexpensive fixing structure in which the fixing position of a spindle motor against a traverse chassis is fixed in the first direction, while can be adjusted sufficiently in the second direction.

In order to achieve the foregoing object, the present invention is directed to a structure for fixing a spindle motor to a traverse chassis in an optical disk apparatus including: the traverse chassis, being adapted to move up and down with respect to the recording surface of an optical disk; the spindle motor, being adapted to be fixed onto the traverse chassis; a turntable fixed to the leading end portion of the main shaft of the spindle motor and adapted to hold the optical disk; and an optical pickup supported on the traverse chassis and adapted to move back and forth in the radial direction along the recording surface of the optical disk, in the bottom surface of the spindle motor, there being formed: an elongated reference hole, the longitudinal direction of which extends in the radial direction centering on the main shaft; and three screw holes provided equiangularly centering on the main shaft, in the traverse chassis, there being formed: a protrusion adapted to be engaged with the reference hole when the reference hole is arranged in an elongated manner in the direction perpendicular to the direction of the movement of the optical pickup; and elongated through holes elongated in the direction perpendicular to the direction of the movement of the optical pickup at the positions corresponding to those of the respective screw holes, and the spindle motor being adapted to be fixed to the traverse chassis by screwing screws into the respective screw holes through the respective through holes while engaging the protrusion with the reference hole, the structure being characterized by the following point. The protrusion has an elliptical cross-sectional shape, the cross-sectional width of the protrusion in the direction of the movement of the optical pickup being approximately the same as the width of the reference hole, while the cross-sectional width of the protrusion in the direction perpendicular to the direction of the movement of the optical pickup being smaller than the cross-sectional width in the direction of the movement of the optical pickup.

In accordance with the arrangement above, since the protrusion is engaged with the reference hole, the movement of the spindle motor with respect to the traverse chassis is limited in the direction of the movement of the optical pickup, that is, in the first direction and the relative position is fixed, while allowed in the direction perpendicular to the direction of the movement of the optical pickup, that is, in the second direction by the length of the longitudinal clearance between the protrusion and the reference hole and the fixing position can be adjusted. The adjustable margin of the fixing position is further increased relative to that in the conventional art for the reason that the cross-sectional width of the protrusion in the second direction is smaller than the cross-sectional width in the first direction. Therefore, the fixing position can be adjusted sufficiently in the second direction. In addition, since it is possible to employ a general-purpose spindle motor without making any modification, the structure can be achieved inexpensively.

In order to achieve the foregoing object, the present invention is also directed to a structure for fixing a spindle motor to a traverse chassis in an optical disk apparatus including: the traverse chassis, being adapted to move up and down with respect to the recording surface of an optical disk; the spindle motor, being adapted to be fixed onto the traverse chassis; a turntable fixed to the leading end portion of the main shaft of the spindle motor and adapted to hold the optical disk; and an optical pickup supported on the traverse chassis and adapted to move back and forth in the radial direction along the recording surface of the optical disk, the structure being characterized by the following points. In the bottom surface of the spindle motor, there are formed: an elongated reference hole, the longitudinal direction of which extends in the radial direction centering on the main shaft; and at least three screw holes spaced out in the circumferential direction centering on the main shaft, and in the traverse chassis, there are formed: a protrusion adapted to be engaged with the reference hole when the reference hole is arranged in an elongated manner in the direction perpendicular to the direction of the movement of the optical pickup; and elongated through holes elongated in the direction perpendicular to the direction of the movement of the optical pickup at the positions corresponding to those of the respective screw holes. The cross-sectional width of the protrusion in the direction of the movement of the optical pickup is approximately the same as the width of the reference hole, while the cross-sectional width of the protrusion in the direction perpendicular to the direction of the movement of the optical pickup is smaller than the cross-sectional width in the direction of the movement of the optical pickup. Then, the spindle motor is adapted to be fixed to the traverse chassis by screwing screws into the respective screw holes through the respective through holes while engaging the protrusion with the reference hole.

In accordance with the arrangement above, since the protrusion is engaged with the reference hole, the movement of the spindle motor with respect to the traverse chassis is limited in the direction of the movement of the optical pickup, that is, in the first direction and the relative position is fixed, while allowed in the direction perpendicular to the direction of the movement of the optical pickup, that is, in the second direction by the length of the longitudinal clearance between the protrusion and the reference hole and the fixing position can be adjusted. The adjustable margin of the fixing position is further increased relative to that in the conventional art for the reason that the cross-sectional width of the protrusion in the second direction is smaller than the cross-sectional width in the first direction. Therefore, the fixing position can be adjusted sufficiently in the second direction. In addition, since it is possible to employ a general-purpose spindle motor without making any modification, the structure can be achieved inexpensively.

Here, when forming a protrusion on the traverse chassis, the protrusion preferably has an elliptical cross-sectional shape in view of its easy formability.

Also, for practical purposes, the screw holes are preferably formed equiangularly centering on the main shaft.

In accordance with the structure for fixing the spindle motor to the traverse chassis in the optical disk apparatus according to the present invention, the fixing position of the spindle motor against the traverse chassis is fixed in the first direction, while can be adjusted sufficiently in the second direction with an inexpensive structure.

DESCRIPTION OF THE PREFERRED EMBODIMENTS

Figure 1:
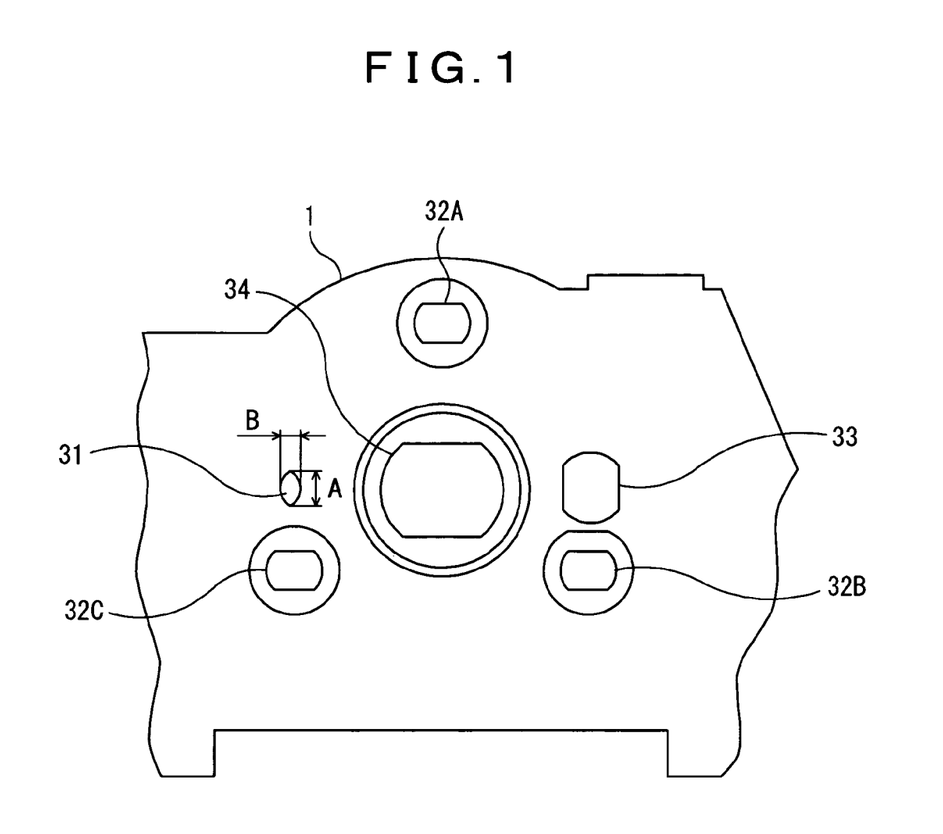
FIG. 1 is a top view of a traverse chassis showing a structure for fixing a spindle motor to the traverse chassis in an optical disk apparatus according to an embodiment of the present invention.
Figure 2:
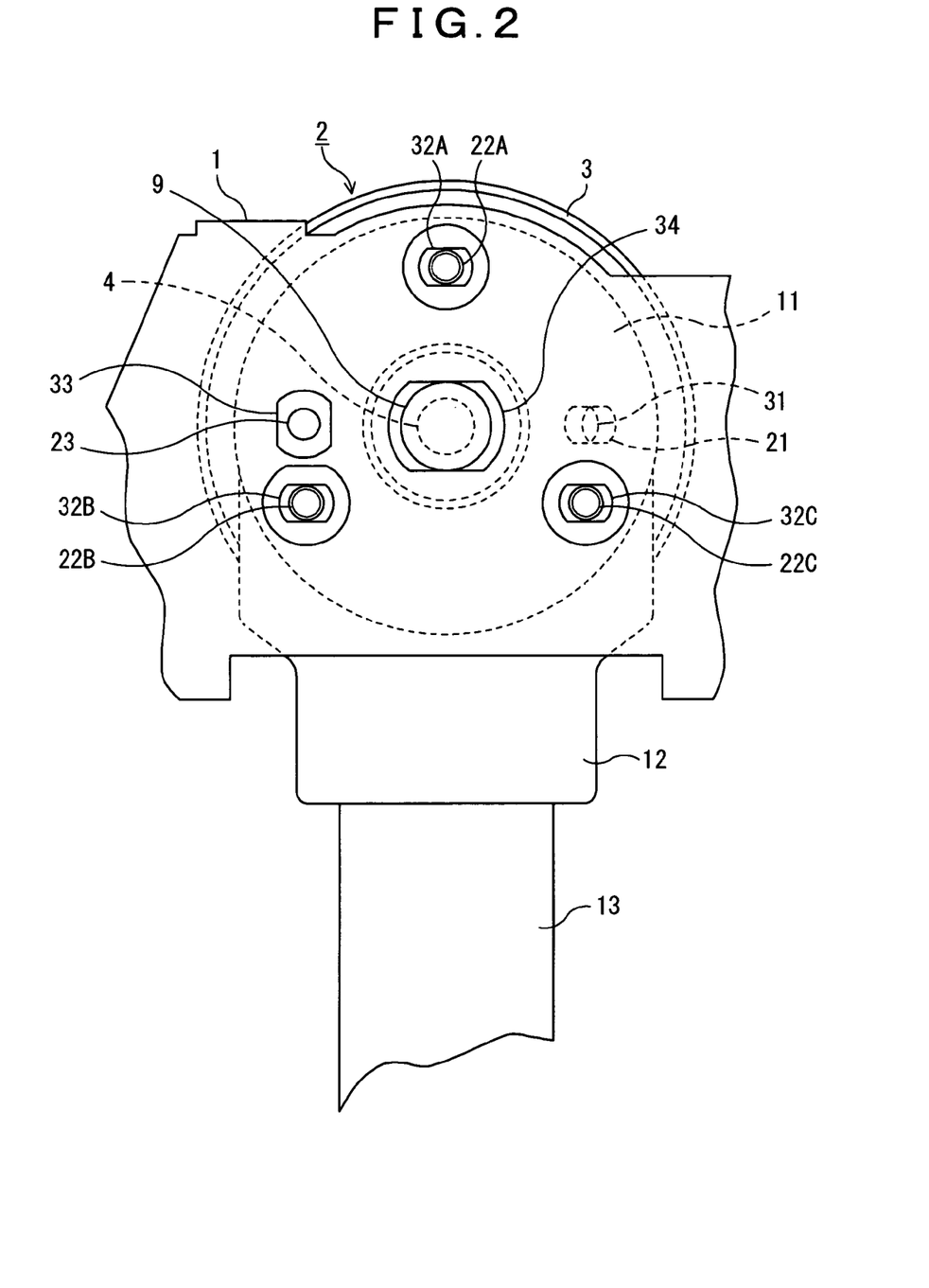
FIG. 2 is a bottom view showing a state where the spindle motor is laid on the traverse chassis shown in FIG. 1.

A structure for fixing a spindle motor to a traverse chassis in an optical disk apparatus according to an embodiment of the present invention will hereinafter be described in detail with reference to the accompanying drawings. FIG. 1 is a top view of a traverse chassis showing a structure for fixing a spindle motor to the traverse chassis in an optical disk apparatus according to an embodiment of the present invention, and FIG. 2 is a bottom view showing a state where the spindle motor is laid on the traverse chassis. It is noted that components shown in these figures and having the same names as well as performing the same functions as those shown in FIGS. 3 to 9 are designated by the same reference numerals to omit redundant description appropriately.

In the present embodiment, the spindle motor 2 is completely the same as that shown in FIGS. 3 to 5, and 7.

Meanwhile, as shown in FIGS. 1 and 2, as for the traverse chassis 1, the elongated center hole 34 for receiving the lower end portion of the bearing holder 9 that protrudes from the base plate 11 of the spindle motor 2, the through holes 32A, 32B, and 32C for permitting the passage of the respective screws 42A, 42B, and 42C to be screwed into the respective screw holes 22A, 22B, and 22C that are formed in the base plate 11 of the spindle motor 2, and the through hole 33 for permitting the passage of the adjusting tool 50 to be inserted into the small hole 23 that is formed in the base plate 11 of the spindle motor 2 are formed in completely the same manner as in the conventional traverse chassis 1 (refer to FIGS. 6 and 7), but the protrusion 31 adapted to be engaged with the reference hole 21 that is formed in the base plate 11 of the spindle motor 2 is formed in a manner significantly different from the conventional traverse chassis 1.

Specifically, on the traverse chassis 1, there is formed a protrusion 31 adapted to be engaged with the reference hole 21 that is formed in the base plate 11 of the spindle motor 2 when the reference hole 21 is arranged in an elongated manner in the direction perpendicular to the direction of the movement of the optical pickup, that is, in the second direction. This point is the same as the form in the conventional traverse chassis 1.

However, the protrusion 31 here has not a circular but an elliptical cross-sectional shape. Then, the cross-sectional width of the protrusion 31 in the direction of the movement of the optical pickup, that is, in the first direction is approximately the same as but, when more appropriate, slightly smaller than the width A of the reference hole 21, while the cross-sectional width B of the protrusion 31 in the second direction is smaller than the cross-sectional width A in the first direction. It is noted that if the traverse chassis 1 is a molded component made of synthetic resin such as polyphenylene ether (PPE), the protrusion 31 having such a shape can be obtained easily by modifying the shape of the carving part in a die for molding the component.

In accordance with the arrangement above, since the protrusion 31 is engaged with the reference hole 21, the movement of the spindle motor 2 with respect to the traverse chassis 1 is limited in the first direction and the relative position is fixed, while allowed in the second direction by the length of the longitudinal clearance between the protrusion 31 and the reference hole 21 and the fixing position can be adjusted. The adjustable margin of the fixing position is further increased relative to that in the conventional art for the reason that the cross-sectional width B of the protrusion 31 in the second direction is smaller than the cross-sectional width A in the first direction. Therefore, the fixing position can be adjusted sufficiently in the second direction. In addition, since it is possible to employ a general-purpose spindle motor 2 without making any modification, the structure can be achieved inexpensively.

In addition to above, the present invention is not restricted to the above-described embodiment, and various modifications may be made without departing from the gist of the invention. For example, the number of the screw holes 22A, 22B, and 22C to be provided in the base plate 11 of the spindle motor 2, the through holes 32A, 32B, and 32C to be provided correspondingly in the traverse chassis 1, and the screws 42A, 42B, and 42C is not restricted to three, and is only required to be three or more. This is for the reason that if the number of screwing positions of the screws 42A, 42B, and 42C is three or more, the spindle motor 2 can be fixed stably to the traverse chassis 1.

Also, the positions of the screw holes 22A, 22B, and 22C to be provided in the base plate 11 of the spindle motor 2 and the through holes 32A, 32B, and 32C to be provided correspondingly in the traverse chassis 1 are not restricted particularly to be equiangular centering on the main shaft 4 as long as the spindle motor 2 can be fixed stably to the traverse chassis 1.

Further, as a spindle motor for rotating the turntable 3, there may be employed a spindle motor in which the leading end portion of a main shaft protrudes from a static housing and the main shaft is adapted to rotate, instead of the spindle motor 2 employed in the above-described embodiment, in which the rotor housing 8 is adapted to rotate together with the main shaft 4.

The present invention is useful for optical disk apparatuses for reproducing/recording information from/onto an optical disk.

What is claimed is:

1. A structure for fixing a spindle motor to a traverse chassis in an optical disk apparatus comprising:

said traverse chassis being adapted to move up and down with respect to a recording surface of an optical disk;

said spindle motor having a main shaft and a bottom surface adapted to be fixed onto said traverse chassis;

a turntable fixed to a leading end portion of the main shaft of said spindle motor and adapted to hold an optical disk; and an optical pickup supported on said traverse chassis and adapted to move back and forth in the radial direction along the recording surface of the optical disk, and wherein:

in the bottom surface of said spindle motor, there being formed: an elongated reference hole, the longest dimension of which extends in a radial direction centered on the main shaft; and three screw holes provided equiangularly centered on the main shaft;

in said traverse chassis, there being formed: a protrusion adapted to engage with said reference hole oriented in a direction perpendicular to the direction of the movement of said optical pickup; and elongated through holes elongated in the direction perpendicular to the direction of the movement of said optical pickup at the positions corresponding to those of said respective screw holes;

said spindle motor being adapted to be fixed to said traverse chassis by screwing screws into said respective screw holes through said respective through holes with said protrusion engaged within said reference hole; and said protrusion has an elliptical cross-sectional shape with a cross-sectional width in the direction of the movement of said optical pickup being approximately the same as the width of said reference hole, while the cross-sectional width of said protrusion in the direction perpendicular to the direction of the movement of said optical pickup being smaller than the cross-sectional width in the direction of the movement of said optical pickup.

2. A structure for fixing a spindle motor to a traverse chassis in an optical disk apparatus comprising:

said traverse chassis, adapted to move up and down with respect to a recording surface of an optical disk;

said spindle motor, having a main shaft and a bottom surface adapted to be fixed onto said traverse chassis;

a turntable fixed to a leading end portion of the main shaft of said spindle motor and adapted to hold an optical disk; and an optical pickup supported on said traverse chassis and adapted to move back and forth in the radial direction along the recording surface of the optical disk, and wherein:

in the bottom surface of said spindle motor, there are formed: an elongated reference hole, the longest dimension of which extends in a radial direction centered on the main shaft; and at least three screw holes circumferentially spaced, centered on the main shaft;

in said traverse chassis, there are formed: a protrusion adapted to engage said reference hole when said reference hole is oriented in a direction perpendicular to the direction of the movement of said optical pickup; and elongated through holes elongated in the direction perpendicular to the direction of the movement of said optical pickup at the positions corresponding to those of said respective screw holes;

the cross-sectional width of said protrusion in the direction of the movement of said optical pickup is approximately the same as the width of said reference hole, while the cross-sectional width of said protrusion in the direction perpendicular to the direction of the movement of said optical pickup is smaller than the cross-sectional width in the direction of the movement of said optical pickup; and said spindle motor is adapted to be fixed to said traverse chassis by screwing screws into said respective screw holes through said respective through holes with said protrusion engaged within said reference hole.

3. The structure for fixing the spindle motor to the traverse chassis according to claim 2, wherein said protrusion has an elliptical cross-sectional shape.

4. The structure for fixing the spindle motor to the traverse chassis according to claim 2, wherein said screw holes are formed equiangularly centered on the main shaft.

5. The structure for fixing the spindle motor to the traverse chassis according to claim 3, wherein said screw holes are formed equiangularly centered on the main shaft.

* * * * *

UNITED STATES PATENT AND TRADEMARK OFFICE
CERTIFICATE OF CORRECTION

| | |
|---|---|
| PATENT NO. | : 7,607,145 B2 |
| APPLICATION NO. | : 11/503233 |
| DATED | : October 20, 2009 |
| INVENTOR(S) | : Takayuki Murakami |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 625 days.

Signed and Sealed this

Twelfth Day of October, 2010

David J. Kappos
*Director of the United States Patent and Trademark Office*